(12) United States Patent
Jiang

(10) Patent No.: US 11,474,026 B2
(45) Date of Patent: Oct. 18, 2022

(54) OPTICAL FINGERPRINT ASSEMBLY AND SIGNAL PROCESSING METHOD

(71) Applicant: Beijing Xiaomi Mobile Software Co., Ltd., Beijing (CN)

(72) Inventor: Zhongsheng Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 170 days.

(21) Appl. No.: 17/129,125

(22) Filed: Dec. 21, 2020

(65) Prior Publication Data

US 2021/0381957 A1 Dec. 9, 2021

(30) Foreign Application Priority Data

Jun. 4, 2020 (CN) .......................... 202010500252.6

(51) Int. Cl.
*G01N 21/27* (2006.01)
*G01N 21/25* (2006.01)
*G06V 40/13* (2022.01)
*G06V 40/12* (2022.01)

(52) U.S. Cl.
CPC ........... *G01N 21/27* (2013.01); *G01N 21/255* (2013.01); *G06V 40/1318* (2022.01); *G06V 40/1365* (2022.01)

(58) Field of Classification Search
CPC .. G01N 21/27; G01N 21/255; G06V 40/1318; G06V 40/1365; G06V 10/141; G06V 10/143; G06V 10/147; G06V 10/17; G06V 10/80; G06K 9/6288; G01J 5/60; G06F 3/0412; G06F 3/041; H03M 1/12
See application file for complete search history.

(56) References Cited

U.S. PATENT DOCUMENTS 11,200,397 B2 * 12/2021 Ding .................. G06V 40/1359
2013/0108124 A1 * 5/2013 Wickboldt ......... G06V 40/1329
361/807
2018/0089409 A1 * 3/2018 Zhang ................. G09G 3/2003

OTHER PUBLICATIONS

Extended European Search Report in European Application No. 20216516.3, dated May 28, 2021.

(Continued)

*Primary Examiner* — Abdullahi Nur
(74) *Attorney, Agent, or Firm* — Finnegan, Henderson, Farabow, Garrett & Dunner, L.L.P.

(57) ABSTRACT

An optical fingerprint assembly includes: a fingerprint sensor configured to collect a light signal for fingerprint identification; a color temperature sensing unit configured to collect a light signal for color temperature detection; a fingerprint signal processing circuit connected to the fingerprint sensor and configured to process the light signal collected by the fingerprint sensor to generate a fingerprint signal; a color temperature signal processing unit connected to the color temperature sensing unit and configured to process the light signal collected by the color temperature sensing unit to generate a color temperature signal; and a control unit connected to the fingerprint signal processing circuit and the color temperature signal processing unit, the control unit being configured to generate fingerprint information according to the fingerprint signal and to generate color temperature information of ambient light according to the color temperature signal.

20 Claims, 9 Drawing Sheets

(56) References Cited

OTHER PUBLICATIONS

Samsung Galaxy S10 Exynos Review, Mar. 10, 2019, retrieved from https://www.devicespecifications.com/en/editor-review/d1fc9b/6, Samsung Galaxy S10 Review—Sensors, May 10, 2021, 4 pages.
Qualcomm 3D Sonic Sensor enables OEMs top-notch security and accuracy [video], OnQ Blog, Feb. 20, 2019, retrieved from https://www.qualcomm.com/news/onq/2019/02/20/samsung-galaxy-s10-taps-qualcomm-3d-sonic-sensor-top-notch-security-and-accuracy, May 11, 2021, 6 pages.
TCS3701 Color and Proximity Sensor, Aug. 28, 2019, 3 pages.
TCS3701 ALS/Color and Proximity Sensor for Use Behind OLED Displays, ams Product Brief, Dec. 19, 2018, 4 pages.
Surur, New light sensor brings dream of the all-screen phone one step closer, Jan. 9, 2019, retrieved from https://mspoweruser.com/new-light-sensor-brings-dream-of-the-all-screen-phone-moves-one-step-closer/, May 11, 2021, 18 pages.

* cited by examiner

OPTICAL FINGERPRINT ASSEMBLY AND SIGNAL PROCESSING METHOD

CROSS-REFERENCE TO RELATED APPLICATIONS

This application is based upon and claims priority to Chinese Patent Application No. 202010500252.6, filed on Jun. 4, 2020, the entire content of which is incorporated herein by reference.

TECHNICAL FIELD

The present disclosure generally relates to the field of communication technologies, and more particularly to an optical fingerprint assembly and a signal processing method.

BACKGROUND

In order to provide a user with a better visual experience, the manufacturer will arrange a color temperature sensor to an electronic device, such as a mobile phone and a tablet PC, to detect, in real time, the color temperature of the environment the user lives in, and to adjust the color temperature of the display screen of the electronic device.

In the related art, the color temperature sensor is usually arranged at the top of the display screen, occupying the space of the device layout. With the development of the full screen, the separate arrangement of the color temperature sensor occupies the layout space, resulting in negative effect on the screen-to-body ratio of the electronic device.

SUMMARY

According to a first aspect of embodiments of the present disclosure, an optical fingerprint assembly includes: a fingerprint sensor configured to collect a light signal for fingerprint identification; a color temperature sensing unit configured to collect a light signal for color temperature detection; a fingerprint signal processing circuit connected to the fingerprint sensor and configured to process the light signal collected by the fingerprint sensor to generate a fingerprint signal; a color temperature signal processing unit connected to the color temperature sensing unit and configured to process the light signal collected by the color temperature sensing unit to generate a color temperature signal; and a control unit connected to the fingerprint signal processing circuit and the color temperature signal processing unit, the control unit being configured to generate fingerprint information for fingerprint identification according to the fingerprint signal output by the fingerprint signal processing circuit and to generate color temperature information of ambient light according to the color temperature signal output by the color temperature signal processing unit.

According to a second aspect of embodiments of the present disclosure, an electronic device includes: a touch display assembly; and an optical fingerprint assembly. An assembly position of the optical fingerprint assembly corresponds to a fingerprint identification region formed at the touch display assembly, or the optical fingerprint assembly is disposed in a layer of color temperature detection and fingerprint identification of the touch display assembly. The optical fingerprint assembly includes: a fingerprint sensor configured to collect a light signal for fingerprint identification; a color temperature sensing unit configured to collect a light signal for color temperature detection; a fingerprint signal processing circuit connected to the fingerprint sensor and configured to process the light signal collected by the fingerprint sensor to generate a fingerprint signal; a color temperature signal processing unit connected to the color temperature sensing unit and configured to process the light signal collected by the color temperature sensing unit to generate a color temperature signal; and a control unit connected to the fingerprint signal processing circuit and the color temperature signal processing unit, the control unit being configured to generate fingerprint information for fingerprint identification according to the fingerprint signal output by the fingerprint signal processing circuit and to generate color temperature information of ambient light according to the color temperature signal output by the color temperature signal processing unit.

According to a third aspect of embodiments of the present disclosure, a signal processing method includes: pre-determining a fingerprint identification condition and a color temperature detection condition; when the fingerprint identification condition is met, collecting a light signal for fingerprint identification by a fingerprint sensor of an optical fingerprint assembly, and inputting the light signal collected by the fingerprint sensor into a fingerprint signal processing circuit of the optical fingerprint assembly to generate fingerprint information for fingerprint identification according to the fingerprint signal output by the fingerprint signal processing circuit; and when the color temperature detection condition is met, collecting a light signal for color temperature detection by a color temperature sensing unit of the optical fingerprint assembly, and inputting the light signal collected by the color temperature sensing unit into a color temperature signal processing unit of the optical fingerprint assembly to generate color temperature information of ambient light according to the color temperature signal output by the color temperature signal processing unit.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Terms used in the present disclosure are only for the purpose of describing exemplary embodiments, but should not be construed to limit the present disclosure. For example, the terms "first", "second", and "third" are only used for distinguishing various information or different elements, rather than indicating a specific order. For example, without departing from the scope of the present disclosure, first information may also be referred to as second information. Similarly, second information may also be referred to as first information.

In order to improve the display effect of an electronic device, a color temperature sensor may be arranged on an outer surface of the electronic device, to allow the electronic device to detect changes in ambient light in real time, and adjust the color temperature of the screen adaptively.

Figure 1:
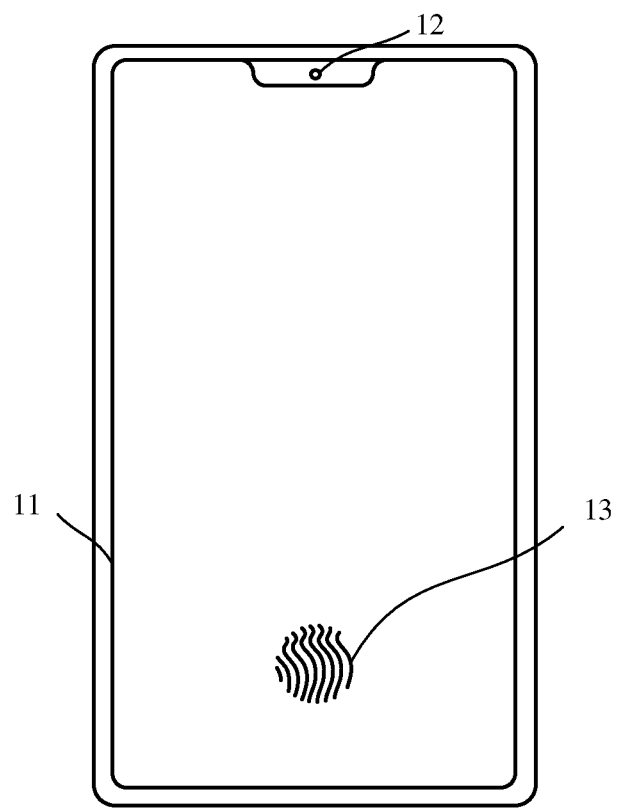
FIG. 1 is a schematic diagram of a smart phone with a separate arrangement of a color temperature sensor according to an embodiment.

In an embodiment, the color temperature sensor may be arranged separately and outside a touch display assembly (i.e., a touch screen) of the electronic device. For example, as illustrated in FIG. 1, a smart phone is provided with a touch display assembly 11 and a color temperature sensor 12 at its front surface. The smart phone provides a specific space to arrange the color temperature 12, and the separate arrangement of the color temperature sensor may affect the appearance of the smart phone, and reduce the screen-to-body ratio of the smart phone. Besides the color temperature sensor, in order to ensure the safety of the device, a number of fingerprint sensors may be regularly distributed under the touch display assembly to form a fingerprint identification area 13 in the touch display assembly 11, as illustrated in FIG. 1.

In view of the above, the present disclosure provides an optical fingerprint assembly to reduce the space occupation for arranging the color temperature sensor.

Figure 2:
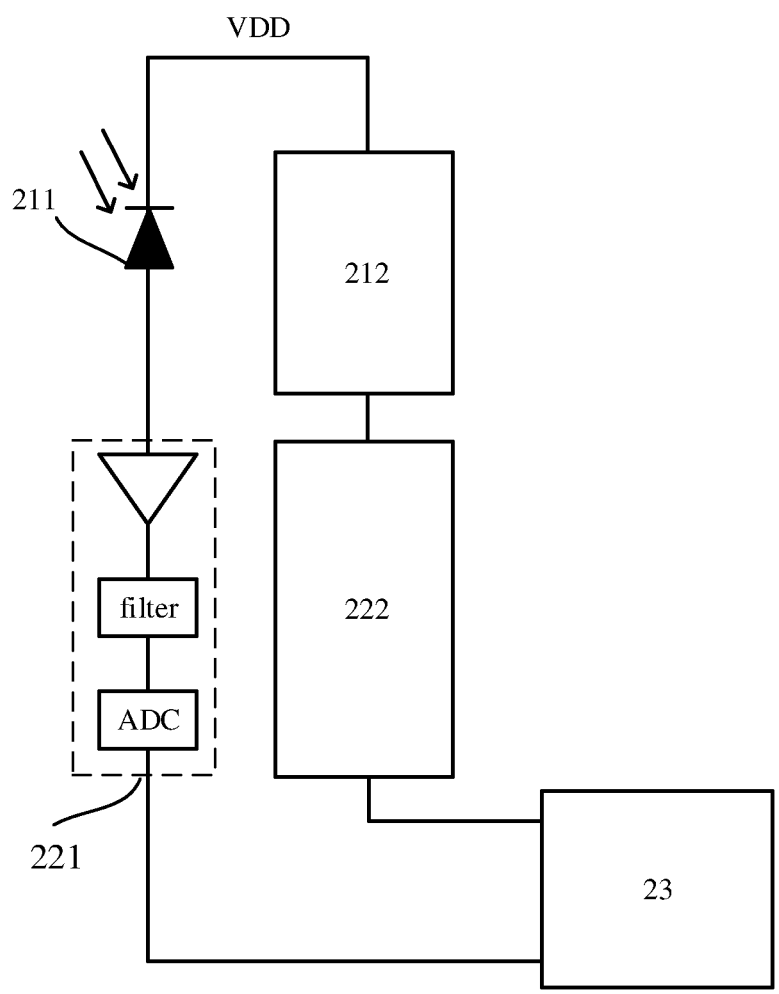
FIG. 2 is a schematic diagram of an optical fingerprint assembly according to an embodiment.

FIG. 2 is a schematic diagram of an optical fingerprint assembly according to an embodiment. As illustrated in FIG. 2, the optical fingerprint assembly includes a fingerprint sensor 211, a color temperature sensing unit 212, a fingerprint signal processing circuit 221, a color temperature signal processing unit 222, and a control unit 23. The fingerprint sensor 211 is configured to collect a light signal for fingerprint identification. The color temperature sensing unit 212 is configured to collect a light signal for color temperature detection. The fingerprint signal processing circuit 221 is connected to the fingerprint sensor 211 and configured to process the light signal collected by the fingerprint sensor 211 to generate a fingerprint signal. The color temperature signal processing unit 222 is connected to the color temperature sensing unit 212 and configured to process the light signal collected by the color temperature sensing unit 212 to generate a color temperature signal. The control unit 23 is connected to the fingerprint signal processing circuit 221 and the color temperature signal processing unit 222, respectively, and configured to generate fingerprint information for fingerprint identification according to the fingerprint signal output by the fingerprint signal processing circuit 221 and to generate color temperature information of ambient light according to the color temperature signal output by the color temperature signal processing unit 222.

In the present disclosure, the color temperature sensing unit 212 and the color temperature signal processing unit 222 may have various structures, as long as the light signal for color temperature detection can be collected and processed.

In some embodiments, as a unit of measuring color components in light, color temperature may not be detected directly according to compound light (i.e., natural light). In this case, the three primary colors are collected separately, and the color temperature value of the light is acquired according to the collected three primary colors.

Figure 3:
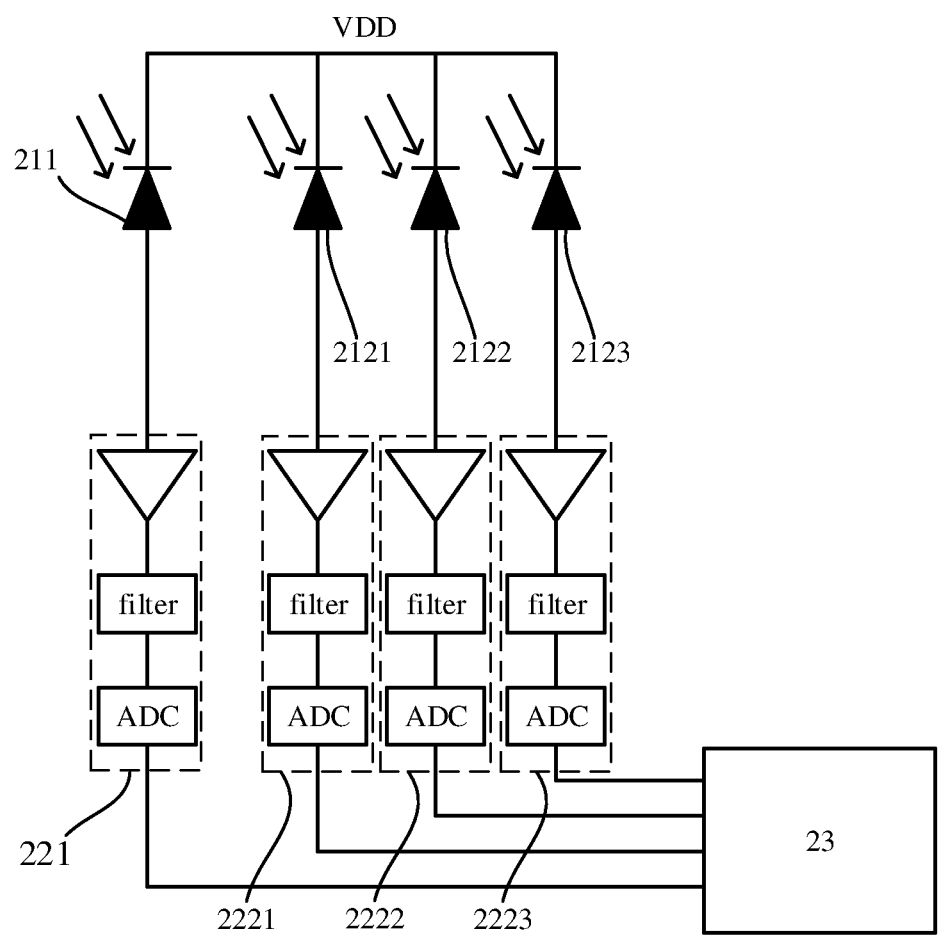
FIG. 3 is a schematic diagram of an optical fingerprint assembly according to an embodiment.

In an embodiment, as illustrated in FIG. 3, the color temperature sensing unit 212 includes: a red light sensor 2121, a green light sensor 2122 and a blue light sensor 2123. In order to process the lights collected by the different monochromatic light sensors, the color temperature signal processing circuit 222 includes: a red light signal processing circuit 2221, a green light signal processing circuit 2222, and a blue light signal processing circuit 2223. The red light sensor 2121 is configured to collect a red light signal for color temperature detection, the green light sensor 2122 is configured to collect a green light signal for color temperature detection, and the blue light sensor 2123 is configured to collect a blue light signal for color temperature detection. The red light signal processing circuit 2221 has a first end connected to the red light sensor 2121 and a second end connected to the control unit 23, and configured to process the red light signal collected by the red light sensor 2121 to obtain a red light color temperature signal. The green light signal processing circuit 2222 has a first end connected to the green light sensor 2122 and a second end connected to the control unit 23, and configured to process the green light signal collected by the green light sensor 2122 to obtain a green light color temperature signal. The blue light signal processing circuit 2223 has a first end connected to the blue light sensor 2123 and a second end connected to the control unit 23, and configured to process the blue light signal collected by the blue light sensor 2123 to obtain a blue light color temperature signal. The control unit 23 is configured to generate the color temperature information of the ambient light according to the red light color temperature signal output by the red light signal processing circuit 2221, the green light color temperature signal output by the green light signal processing circuit 2222 and the blue color temperature signal output by the blue light signal processing circuit 2223. In this embodiment, each of the sensors is configured to collect a corresponding light and the light is processed by the corresponding circuit, thus making the processing of different monochromatic lights more accurate, and further improving the accuracy of the finally obtained color temperature.

In some embodiments, the red light signal collected by the red light sensor may not be a pure red light, and may contain a small quantity of monochromatic light other than the red light, such as a green light and a blue light. Similarly, the green light signal collected by the green light sensor may contain monochromatic light other than the green light, such as a red light and a blue light. The blue light signal collected by the blue light sensor may contain monochromatic light other than the blue light, such as a red light and a green light. In order to improve the accuracy of the color temperature detection, the collected monochromatic lights may be filtered for purification. For example, the control unit 23 is further configured to: remove a color temperature signal, contained in the red light color temperature signal, that is processed from the monochromatic light other than the red light; remove a color temperature signal, contained in the green light color temperature signal, that is processed from the monochromatic light other than the green light; and remove a color temperature signal, contained in the blue light color temperature signal, that is processed from the monochromatic light other than the blue light.

In some embodiments, the fingerprint signal processing circuit, the red light signal processing circuit, the green light signal processing circuit, and the blue light signal processing circuit may each include an amplifying circuit, a filtering circuit, and an analog-to-digital conversion circuit sequentially connected in series. As illustrated in FIG. 3, the fingerprint signal processing circuit 221 includes: a first amplifying circuit, a first filtering circuit and a first analog-to-digital conversion circuit sequentially connected in series. The red light signal processing circuit 2221 includes: a second amplifying circuit, a second filtering circuit and a second analog-to-digital conversion circuit sequentially connected in series. The green light signal processing circuit 2222 includes: a third amplifying circuit, a third filtering circuit and a third analog-to-digital conversion circuit sequentially connected in series. The blue light signal processing circuit 2223 includes: a fourth amplifying circuit, a fourth filtering circuit and a fourth analog-to-digital conversion circuit sequentially connected in series.

The amplifying circuit, the filter circuit, and analog-to-digital conversion circuit in series described above can be regarded as a rectifier circuit, which can effectively reduce impurity and weakness of the collected light signal.

In the embodiments, the optical fingerprint assembly includes a plurality of color temperature sensing units arranged in different regions of the optical fingerprint assembly. In this case, the plurality of color temperature sensing units are arranged at different physical locations of the optical fingerprint assembly, to allow the optical fingerprint assembly to collect the color temperature signals at different locations. On this basis, the color temperature signals of the different locations may be integrated and processed, thus reducing the interference of accidental factors on light intensity detection, and making the finally obtained color temperature information of the ambient light more accurate. In addition, the screen of the electronic device may emit different lights based on the display requirements, which causes interference on the collection of the ambient light. Since the light signals of different locations of the screen are comprehensively processed in the integrating manner as described above, the interference of the screen light on the color temperature detection may be reduced to a certain extent. The above integration manner may be determined by those skilled in the art according to practices. For example, the light intensity signal may be processed by a weighted average algorithm.

In some embodiments, in order to ensure the integration of the optical fingerprint assembly, the color temperature sensing unit may be arranged within a predetermined distance of the fingerprint sensor, such that the color temperature sensing unit is close to the fingerprint sensor in the physical location to further ensure that the color temperature sensing unit and the fingerprint sensor are arranged in the same region, thus avoiding a separate arrangement of the color temperature sensor. For example, multiple fingerprint sensors may be required to realize the fingerprint identification. Accordingly, the color temperature sensor may also be arranged among the multiple fingerprint sensors, or arranged around a fingerprint identification region formed by the multiple fingerprint sensors. Specific arrangement of the color temperature sensor may be determined by those skilled in the art according to the practices.

In some embodiments, the control unit 23 may be a microcontroller unit (MCU), a digital signal processor (DSP), or a central processing unit (CPU). These examples are only illustrative. It should be understood that any hardware that is able to generate the color temperature information of the ambient light according to the color temperature signal and generate the fingerprint information for fingerprint identification according to the fingerprint signal can be used as the control unit of the present disclosure.

The optical fingerprint assembly provided by the present disclosure may realize both functions of the color temperature detection and the fingerprint identification, such that when the assembly is applied in an electronic device, there is no need to separately arrange the color temperature sensor and the fingerprint sensor, thus avoiding problems caused by the separate arrangement of the color temperature sensor and the reduce of the screen-to-body ratio in the related art.

Moreover, with the above-described optical fingerprint assembly, space occupied by the color temperature sensor on the electronic device mainboard is reduced since there is no need to arrange the color temperature sensor separately, so that developers can more flexibly arrange various components of the mainboard, reducing development difficulty.

Further, in the embodiments, monochromatic light signals are obtained, and further integrated and processed to obtain the color temperature information of the ambient light. Since each monochromatic light corresponding to the three primary colors is processed separately, the light processing is more refined, so that the final color temperature information of the ambient light obtained is more accurate, that is, the accuracy of the color temperature detection is improved.

Figure 4:
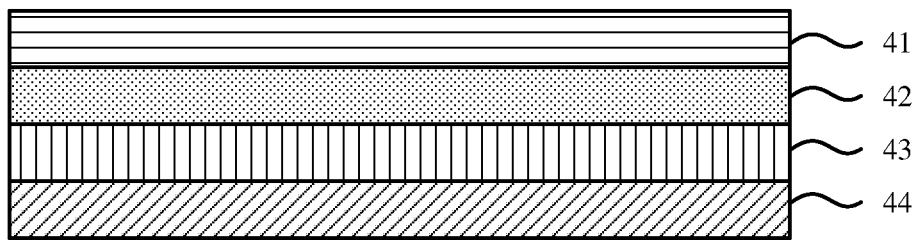
FIG. 4 is a schematic diagram of a touch display assembly according to an embodiment.

FIG. 4 is a schematic diagram of a touch display assembly according to an embodiment. As illustrated in FIG. 4, the touch display assembly includes a glass cover layer 41; a touch layer 42 having a sensing side facing the glass cover layer; a display layer 43 having a light emitting side facing a non-sensing side of the touch layer; and a layer 44 of color temperature detection and fingerprint identification, including an optical fingerprint assembly as described above, and having a light incident side facing a non-light emitting side of the display layer.

In the embodiment, the glass cover layer 41 is made of a transparent glass material for protecting the touch display assembly. The sensing side of the touch layer 42 may generate a touch signal corresponding to touch position of a user. A way of generating the touch signal may be a sensing method, for example, of a capacitive screen or a resistive screen. The display layer 43 is also referred to as a light-emitting layer, and is configured to display an image corresponding to a control signal. The layer 44 of color temperature detection and fingerprint identification includes the optical fingerprint assembly as described above.

In the embodiment, the layer of color temperature detection and fingerprint identification of the touch display assembly includes the above-described optical fingerprint assembly. The processes of color temperature detection and fingerprint identification are both performed by the touch display assembly, so that the electronic device applying the touch display assembly does not need to have a separate color temperature sensor, and thus such an electronic device has a higher screen-to-body ratio compared with an electronic device with the color temperature sensor separately arranged outside the touch display assembly.

Figure 5:
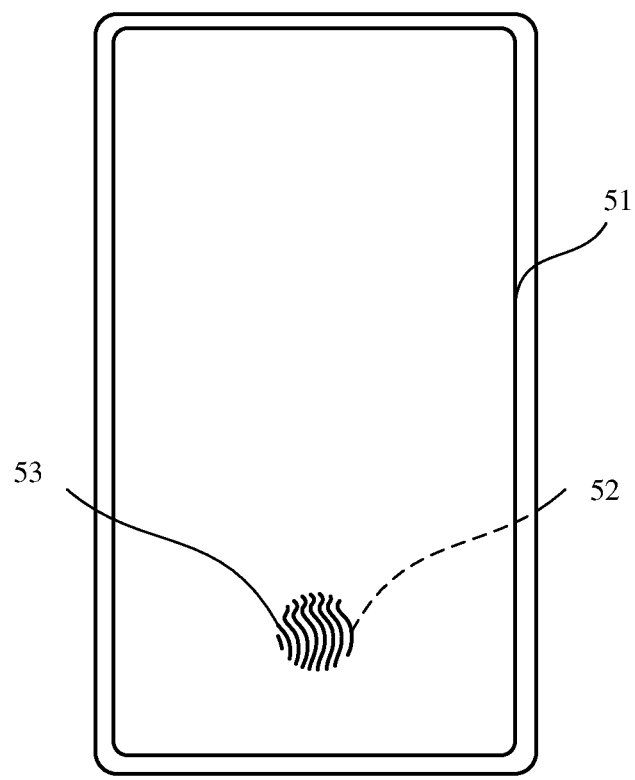
FIG. 5 is a schematic diagram of an electronic device provided with an optical fingerprint assembly according to an embodiment.

FIG. 5 is a schematic diagram of an electronic device provided with an optical fingerprint assembly according to an embodiment. As illustrated in FIG. 5, the electronic device includes a touch display assembly 51 and an optical fingerprint assembly 52 as described above. An assembly position of the optical fingerprint assembly 52 corresponds to a fingerprint identification region 53 formed at the touch display assembly 51. The electronic device may include the touch display assembly as illustrated in FIG. 4.

In this embodiment, the user may touch the fingerprint identification region 53 with a finger to allow the electronic device to perform operations of the fingerprint identification.

In some embodiments, to accurately detect the user's fingerprint, multiple fingerprint sensors are regularly distributed in the optical fingerprint assembly 52, and the color temperature sensing unit of the optical fingerprint assembly may be arranged among the multiple fingerprint sensors. In this case, the location of the color temperature sensor is changed from outside the touch display assembly as a common layout of the related art to the fingerprint identification region of the touch display assembly, avoiding the separate arrangement of the color temperature sensor.

In the electronic device, the optical fingerprint assembly described above is assembled at the fingerprint identification region. In this case, both the fingerprint sensor and the color temperature sensor are arranged in the touch display assembly, which avoids decrease in the screen-to-body ratio due to the separate arrangement of the color temperature sensor.

Figure 6:
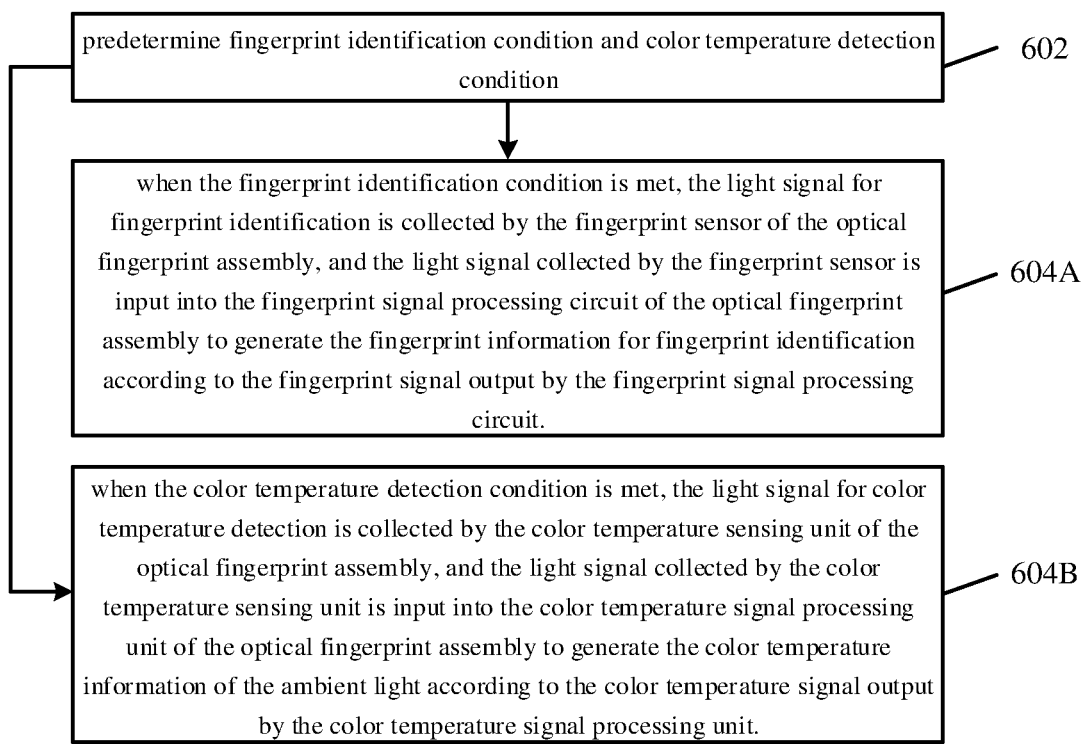
FIG. 6 is a flow chart of a signal processing method according to an embodiment.

FIG. 6 is a flow chart of a signal processing method according to an embodiment. The signal processing method is applied to an electronic device including an optical fingerprint assembly as described above. The signal processing method includes the following operations.

In block 602, a fingerprint identification condition and a color temperature detection condition are predetermined.

In the embodiment, the optical fingerprint assembly of FIG. 2 or FIG. 3 may be applied, and the optical fingerprint assembly is assembled at the fingerprint identification region of the touch display assembly. Accordingly, both the light signal for fingerprint identification and the light signal for color temperature detection are collected by the touch display assembly, thus avoiding the decrease in the screen-to-body ratio due to the separate arrangement of the color temperature sensor.

In the embodiment, it can be determined whether a current operation is an operation of the color temperature detection or the fingerprint identification according to the fingerprint identification condition and the color temperature detection condition which are pre-determined, to allow the corresponding sensor to collect the light signal and the corresponding processing circuit to process the signal.

In block 604A, when the fingerprint identification condition is met, the light signal for fingerprint identification is collected by the fingerprint sensor of the optical fingerprint assembly, and the light signal collected by the fingerprint sensor is input into the fingerprint signal processing circuit of the optical fingerprint assembly to generate the fingerprint information for fingerprint identification according to the fingerprint signal output by the fingerprint signal processing circuit.

In block 604B, when the color temperature detection condition is met, the light signal for color temperature detection is collected by the color temperature sensing unit of the optical fingerprint assembly, and the light signal collected by the color temperature sensing unit is input into the color temperature signal processing unit of the optical fingerprint assembly to generate the color temperature information of the ambient light according to the color temperature signal output by the color temperature signal processing unit.

In some embodiments, the user's finger may touch the fingerprint identification region for fingerprint identification to perform operations such as unlocking and payment. If the user does not touch the fingerprint identification region, there is usually no need to perform fingerprint identification operation, but the electronic device may be required to collect the ambient light to make an adaptive adjustment. Therefore, it can be determined whether a light intensity signal or a fingerprint signal needs to be generated by determining whether a touch action is detected in the fingerprint identification region formed at the touch display assembly of the electronic device. When the touch action is detected at the fingerprint identification region, it is determined that the fingerprint identification condition is met. When the touch action is not detected at the fingerprint identification region, the color temperature detection condition is met. In this case, as long as the fingerprint identification region is not touched, the electronic device may perform the color temperature detection.

In some embodiments, that there may be false touches. Therefore, under the premise of the above fingerprint identification condition, that is, in the case of the touch action is detected at the fingerprint identification region, it may be further determined whether a pressing force corresponding to the touch action is less than a preset pressure threshold. If the pressing force is not less than the preset pressure threshold, it is determined that the fingerprint identification condition is met. Under the premise of the above color temperature detection condition, it may be further determined whether a time period during which no touch action is detected at the fingerprint identification region exceeds a preset time period, if so, it is determined that the color temperature detection condition is met.

The color temperature detection condition and the fingerprint identification condition may also be set in other ways. For example, they can be set according to the functions enabled by the electronic device. The color temperature detection condition may be set to be met when a color temperature detection function of the electronic device is turned on, and the fingerprint identification condition may be set to be met when a fingerprint payment function of the electronic device is turned on. These examples are only illustrative, and those skilled in the art can set different color temperature detection conditions and fingerprint identification conditions according to practice.

In an embodiment, when either one of the color temperature detection condition and the fingerprint identification condition is not met, the other is determined to be met. In another embodiment, the color temperature detection condition and the fingerprint identification condition are independent.

In the above embodiments, light signals for generating the color temperature signal and the fingerprint signal are collected by the optical fingerprint assembly arranged in the touch display assembly, thus reducing occupation of the layout space due to the separately arranged color temperature sensor in the related art.

Further, in the embodiments, it is determined whether the currently collected light signal is used for the fingerprint identification or the color temperature detection by determining whether the touch action is detected at the fingerprint identification region. When the user touches the fingerprint identification region, the user may unlock the device or perform payment. When the user does not touch the fingerprint identification region, the electronic device may change the brightness of the display screen according to the changes in the ambient light. The color temperature detection or the fingerprint identification may be performed according to the needs of the user, thus improving the user experience.

Figure 7:
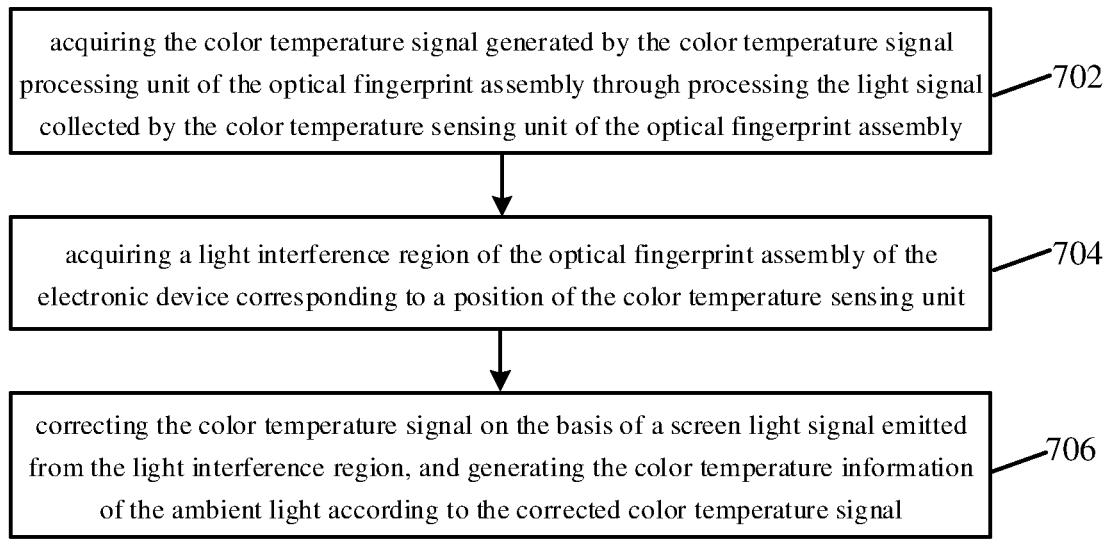
FIG. 7 is a flow chart of a color temperature detection method according to an embodiment.

FIG. 7 is a flow chart of a color temperature detection method according to an embodiment. The color temperature detection method may be applied to an electronic device including an optical fingerprint assembly as described above. The color temperature detection method includes the following operations.

In block 702, the color temperature signal generated by the color temperature signal processing unit of the optical fingerprint assembly is acquired through processing the light signal collected by the color temperature sensing unit of the optical fingerprint assembly.

In an embodiment, the color temperature detection may require the red light sensor, the green light sensor, and the blue light sensor to collect different monochromatic light signals, and further integrate the color temperature signals of the ambient light. Therefore, the acquisition of the color temperature signal generated by the color temperature signal processing unit of the optical fingerprint assembly through processing the light signal collected by the color temperature sensing unit of the optical fingerprint assembly includes: acquiring the red light color temperature signal, the green light color temperature signal, and the blue light color temperature signal, in which the red light color temperature signal is obtained by the red light signal processing circuit of the color temperature signal processing unit through processing the red light signal collected by the red light sensor of the color temperature sensing unit, the green light color temperature signal is obtained by the green light signal processing circuit of the color temperature signal processing unit through processing the green light signal collected by the green light sensor of the color temperature sensing unit, and the blue light color temperature signal is obtained by the blue light signal processing circuit of the color temperature signal processing unit through processing the blue light signal collected by the blue light sensor of the color temperature sensing unit.

In block 704, a light interference region of the optical fingerprint assembly of the electronic device corresponding to a position of the color temperature sensing unit is acquired.

In an embodiment, the screen may emit lights of different colors, which may interfere with the process of collecting the ambient light by the sensors. In other words, when the sensors are arranged in the touch display assembly, the received light may be actually a mixed light of the ambient light and the screen light. Therefore, in order to improve the accuracy of the color temperature detection, it is necessary to eliminate the interference of the screen light.

Since the red light sensor, the green light sensor, and the blue light sensor are used in the embodiment, it is necessary to acquire the light interference regions corresponding to different sensors, respectively. The acquisition of the light interference region of the optical fingerprint assembly of the electronic device corresponding to the position of the color temperature sensing unit includes: acquiring a red light interference region of the optical fingerprint assembly corresponding to a position of the red light sensor of the color temperature sensing unit, acquiring a green light interference region of the optical fingerprint assembly corresponding to a position of the green light sensor of the color temperature sensing unit, and acquiring a blue light interference region of the optical fingerprint assembly corresponding to a position of the blue light sensor of the color temperature sensing unit.

In block 706, the color temperature signal is corrected on the basis of a screen light signal emitted from the light interference region, and the color temperature information of the ambient light is generated according to the corrected color temperature signal.

In the case of acquiring each monochromatic light interference region, the collected color temperature signal of each monochromatic light may be corrected based on each monochromatic light interference region, thus improving the accuracy of the color temperature detection. For example, the correction may include: processing the red light color temperature signal on the basis of a screen light signal corresponding to the red light interference region (R interference region) to obtain a corrected red light color temperature signal, processing the green light color temperature signal on the basis of a screen light signal corresponding to the green light interference region (G interference region) to obtain a corrected green light color temperature signal, and processing the blue light color temperature signal on the basis of a screen light signal corresponding to the blue light interference region (B interference region) to obtain a corrected blue light color temperature signal.

Various methods can be applied to correct each monochromatic light color temperature signal corresponding to the monochromatic light interference region. In an embodiment, the color temperature signal of each monochromatic light may be processed on the basis of the screen light signal corresponding to each monochromatic light interference region. For example, the processing of the red light color temperature signal includes: determining a red light component, a green light component, and a blue light component contained in the screen light signal corresponding to the red light interference region, acquiring a first interference coefficient of the red light component for the red light color temperature signal, a second interference coefficient of the green light component for the red light color temperature signal, and a third interference coefficient of the blue light component for the red light color temperature signal, and correcting the red light color temperature signal on the basis of the red light component and the first interference coefficient, the green light component and the second interference coefficient, and the blue light component and the third interference coefficient.

The processing of the green light color temperature signal includes: determining a red light component, a green light component, and a blue light component contained in the screen light signal corresponding to the green light interference region, acquiring a fourth interference coefficient of the red light component for the green light color temperature signal, a fifth interference coefficient of the green light component for the green light color temperature signal, and a sixth interference coefficient of the blue light component for the green light color temperature signal, and correcting the green light color temperature signal on the basis of the red light component and the fourth interference coefficient, the green light component and the fifth interference coefficient, and the blue light component and the sixth interference coefficient.

The processing of the blue light color temperature signal includes: determining a red light component, a green light component, and a blue light component contained in the screen light signal corresponding to the blue light interference region, acquiring a seventh interference coefficient of the red light component for the blue light color temperature signal, an eighth interference coefficient of the green light component for the blue light color temperature signal, and a ninth interference coefficient of the blue light component for the blue light color temperature signal, and correcting the blue light color temperature signal on the basis of the red light component and the seventh interference coefficient, the green light component and the eighth interference coefficient, and the blue light component and the ninth interference coefficient.

The above correction is described with the example that the red light color temperature signal is corrected on the basis of the R interference region. Display content of the touch display assembly in the R interference region is acquired, and the display content is analyzed to acquire the monochromatic light weight, i.e., R weight, G weight and B weight. It is assumed that Rx represents an initial red light color temperature signal acquired from the processing, the R weight value is R1, the first interference coefficient for the red light color temperature signal is k1, the G weight value is G1, the second interference coefficient for the red light color temperature signal is k2, and the B weight value is B1 and the third interference coefficient for the red light color temperature signal is k3, then the corrected red light color temperature signal Ry meets a formula: $Ry=Rx-k1R1-k2G1-k3B1$.

Similarly, the corrected green light color temperature signal Gy meets the formula: $Gy=Gx-k4R2-k5G2-k6B2$, where Gx represents an initial green light color temperature signal acquired from the processing, R2 represents a value of the R weight in the green light interference region, the fourth interference coefficient for the green light color temperature signal is k4, G2 represents a value of the G weight in the green light interference region, the fifth interference coefficient for the green light color temperature signal is k5, B2 represents a value of the B weight in the green light interference region, and the sixth interference coefficient for the green light color temperature signal is k6.

The corrected blue light color temperature signal By meets the formula: $By=Bx-k7R3-k8G3-k9B3$, where Bx represents an initial blue light color temperature signal acquired from the processing, R3 represents a value of the R weight in the blue light interference region, the seventh interference coefficient for the blue light color temperature signal is k7, G3 represents a value of the G weight in the blue light interference region, the eighth interference coefficient for the blue light color temperature signal is k8, B3 represents a value of the B weight in the blue light interference region, and the ninth interference coefficient for the blue light color temperature signal is k9.

Based on the above processes, the color temperature information of the ambient light may be generated according to the corrected red light color temperature signal, the corrected green light color temperature signal, and the corrected blue light color temperature signal.

The above method can firstly acquire the light interference region of the optical fingerprint assembly of the electronic device corresponding to the color temperature sensing unit, and then correct the collected color temperature signal through the light interference region, thus increasing the accuracy of the processed color temperature signal and further improving the accuracy of the generated color temperature information of the ambient light.

Further, the above method acquires each monochromatic light interference region, and corrects each monochromatic light color temperature signal by analyzing the display content in each monochromatic light interference region, such that the processed monochromatic light color temperature signal is more accurate. In other words, the above method may correct the color temperature signal at a fine level of the monochromatic light color temperature signal, and further improve the color temperature information of the ambient light obtained based on the corrected color temperature signal.

Corresponding to the above embodiments of the signal processing method and color temperature detection method, the present disclosure also provides embodiments of a signal processing device and a color temperature detection device.

Figure 8:
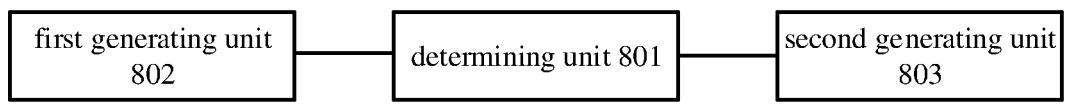
FIG. 8 is a block diagram of a signal processing device according to an embodiment.

FIG. 8 is a block diagram of a signal processing device according to an embodiment. As illustrated in FIG. 8, the signal processing device includes a determining unit 801, a first generating unit 802, and a second generating unit 803.

The determining unit 801 is configured to pre-determine a fingerprint identification condition and a color temperature detection condition.

The first generating unit 802 is configured to, when the fingerprint identification condition is met, collect the light signal for fingerprint identification by the fingerprint sensor of the optical fingerprint assembly, and input the light signal collected by the fingerprint sensor into the fingerprint signal processing circuit of the optical fingerprint assembly to generate the fingerprint information for fingerprint identification according to the fingerprint signal output by the fingerprint signal processing circuit.

The second generating unit 803 is configured to, when the color temperature detection condition is met, collect the light signal for color temperature detection by the color temperature sensing unit of the optical fingerprint assembly, and input the light signal collected by the color temperature sensing unit into the color temperature signal processing unit of the optical fingerprint assembly to generate the color temperature information of the ambient light according to the color temperature signal output by the color temperature signal processing unit.

Figure 9:
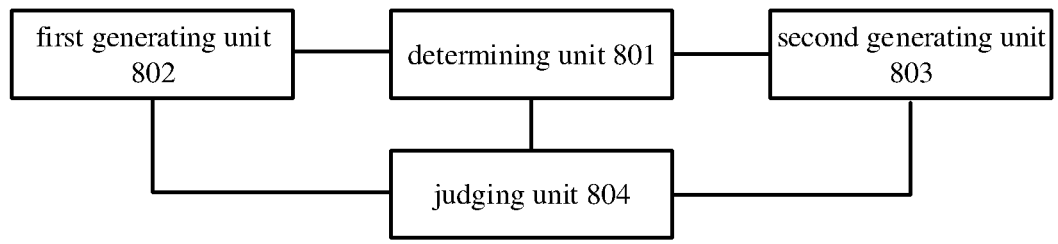
FIG. 9 is a block diagram of a signal processing device according to an embodiment.

FIG. 9 is a block diagram of a signal processing device according to an embodiment. Based on the signal processing device as illustrated in FIG. 8, the signal processing device further includes a judging unit 804.

The judging unit 804 is configured to determine whether a touch action is detected in the fingerprint identification region formed at the touch display assembly of the electronic device. The fingerprint identification condition includes detecting the touch action is at the fingerprint identification region. The color temperature detection condition includes detecting no touch action at the fingerprint identification region.

In an embodiment, the the fingerprint identification condition further includes determining a pressing force corresponding to the touch action to be equal to or more than a preset pressure threshold when the touch action is detected at the fingerprint identification region. The color temperature detection condition further includes detecting no touch action at the fingerprint identification region during a preset time period.

In an embodiment, when either one of the color temperature detection condition and the fingerprint identification condition is not met, the other is determined to be met.

In an embodiment, the color temperature detection condition and the fingerprint identification condition are independent of each other.

Figure 10:
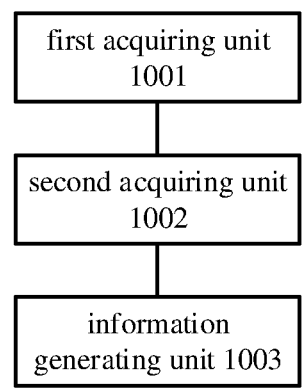
FIG. 10 is a block diagram of a color temperature detection device according to an embodiment.

FIG. 10 is a block diagram of a color temperature detection device according to an embodiment. As illustrated in FIG. 10, the color temperature detection device includes a first acquiring unit 1001, a second acquiring unit 1002, and an information generating unit 1003.

The first acquiring unit 1001 is configured to acquire the color temperature signal generated by the color temperature signal processing unit of the optical fingerprint assembly through processing the light signal collected by the color temperature sensing unit of the optical fingerprint assembly.

The second acquiring unit 1002 is configured to acquire a light interference region of the optical fingerprint assembly of the electronic device corresponding to a position of the color temperature sensing unit.

The information generating unit 1003 is configured to correct the color temperature signal on the basis of a screen light signal emitted from the light interference region, and generate the color temperature information of the ambient light according to the corrected color temperature signal.

In an embodiment, the first acquiring unit 1001 is further configured to acquire the red light color temperature signal, the green light color temperature signal, and the blue light color temperature signal, in which the red light color temperature signal is obtained by the red light signal processing circuit of the color temperature signal processing unit through processing the red light signal collected by the red light sensor of the color temperature sensing unit, the green light color temperature signal is obtained by the green light signal processing circuit of the color temperature signal processing unit through processing the green light signal collected by the green light sensor of the color temperature sensing unit, and the blue light color temperature signal is obtained by the blue light signal processing circuit of the color temperature signal processing unit through processing the blue light signal collected by the blue light sensor of the color temperature sensing unit.

The second acquiring unit 1002 is further configured to acquire a red light interference region of the optical fingerprint assembly corresponding to a position of the red light sensor of the color temperature sensing unit, acquire a green light interference region of the optical fingerprint assembly corresponding to a position of the green light sensor of the color temperature sensing unit, and acquire a blue light interference region of the optical fingerprint assembly corresponding to a position of the blue light sensor of the color temperature sensing unit.

The information generating unit 1003 is further configured to process the red light color temperature signal on the basis of a screen light signal corresponding to the red light interference region to obtain a corrected red light color temperature signal, process the green light color temperature signal on the basis of a screen light signal corresponding to the green light interference region to obtain a corrected green light color temperature signal, and process the blue light color temperature signal on the basis of a screen light signal corresponding to the blue light interference region to obtain a corrected blue light color temperature signal; and generate the color temperature information of the ambient light according to the corrected red light color temperature signal, the corrected green light color temperature signal and the corrected blue light color temperature signal.

In an embodiment, the information generating unit 1003 is further configured to: determine a red light component, a green light component, and a blue light component contained in the screen light signal corresponding to the red light interference region, acquire a first interference coefficient of the red light component for the red light color temperature signal, a second interference coefficient of the green light component for the red light color temperature signal, and a third interference coefficient of the blue light component for the red light color temperature signal, and correct the red light color temperature signal on the basis of the red light component and the first interference coefficient, the green light component and the second interference coefficient, and the blue light component and the third interference coefficient; determine a red light component, a green light component, and a blue light component contained in the screen light signal corresponding to the green light interference region, acquire a fourth interference coefficient of the red light component for the green light color temperature signal, a fifth interference coefficient of the green light component for the green light color temperature signal, and a sixth interference coefficient of the blue light component for the green light color temperature signal, and correct the green light color temperature signal on the basis of the red light component and the fourth interference coefficient, the green light component and the fifth interference coefficient, and the blue light component and the sixth interference coefficient; determine a red light component, a green light component, and a blue light component contained in the screen light signal corresponding to the blue light interference region, acquire a seventh interference coefficient of the red light component for the blue light color temperature signal, an eighth interference coefficient of the green light component for the blue light color temperature signal, and a ninth interference coefficient of the blue light component for the blue light color temperature signal, and correct the blue light color temperature signal on the basis of the red light component and the seventh interference coefficient, the green light component and the eighth interference coefficient, and the blue light component and the ninth interference coefficient.

Regarding the devices in the above embodiments, specific manners in which each unit performs operations have been described in detail in the method embodiments, and thus will not be repeated here.

The device embodiments described above are only exemplary. The units described as separate components may or may not be physically separated, and the components illustrated as the units may or may not be physical units, that is, they may be located in the same place, or it can be distributed to multiple networks. Some or all of the units can be selected according to practice to achieve the objectives of the present disclosure.

Accordingly, the present disclosure provides a signal processing/color temperature detection device, including a memory having stored therein an instruction; and a processor configured to execute the instruction for implementing the methods described above. For example, the signal processing method may include: pre-determining a fingerprint identification condition and a color temperature detection condition; when the fingerprint identification condition is met, collecting the light signal for fingerprint identification by the fingerprint sensor of the optical fingerprint assembly, inputting the light signal collected by the fingerprint sensor into the fingerprint signal processing circuit of the optical fingerprint assembly to generate the fingerprint information for fingerprint identification according to the fingerprint signal output by the fingerprint signal processing circuit; and when the color temperature detection condition is met, collecting the light signal for color temperature detection by the color temperature sensing unit of the optical fingerprint assembly, inputting the light signal collected by the color temperature sensing unit into the color temperature signal processing unit of the optical fingerprint assembly to generate the color temperature information of the ambient light according to the color temperature signal output by the color temperature signal processing unit.

Accordingly, the present disclosure also provides an electronic apparatus, including a memory stored therein one or more programs. The one or more programs including instructions for realizing the signal processing/color temperature detection methods described above are executed by one or more processors. For example, the signal processing method may include: pre-determining a fingerprint identification condition and a color temperature detection condition; when the fingerprint identification condition is met, collecting the light signal for fingerprint identification by the fingerprint sensor of the optical fingerprint assembly, inputting the light signal collected by the fingerprint sensor into the fingerprint signal processing circuit of the optical fingerprint assembly to generate the fingerprint information for fingerprint identification according to the fingerprint signal output by the fingerprint signal processing circuit; and when the color temperature detection condition is met, collecting the light signal for color temperature detection by the color temperature sensing unit of the optical fingerprint assembly, inputting the light signal collected by the color temperature sensing unit into the color temperature signal processing unit of the optical fingerprint assembly to generate the color temperature information of the ambient light according to the color temperature signal output by the color temperature signal processing unit.

Figure 11:
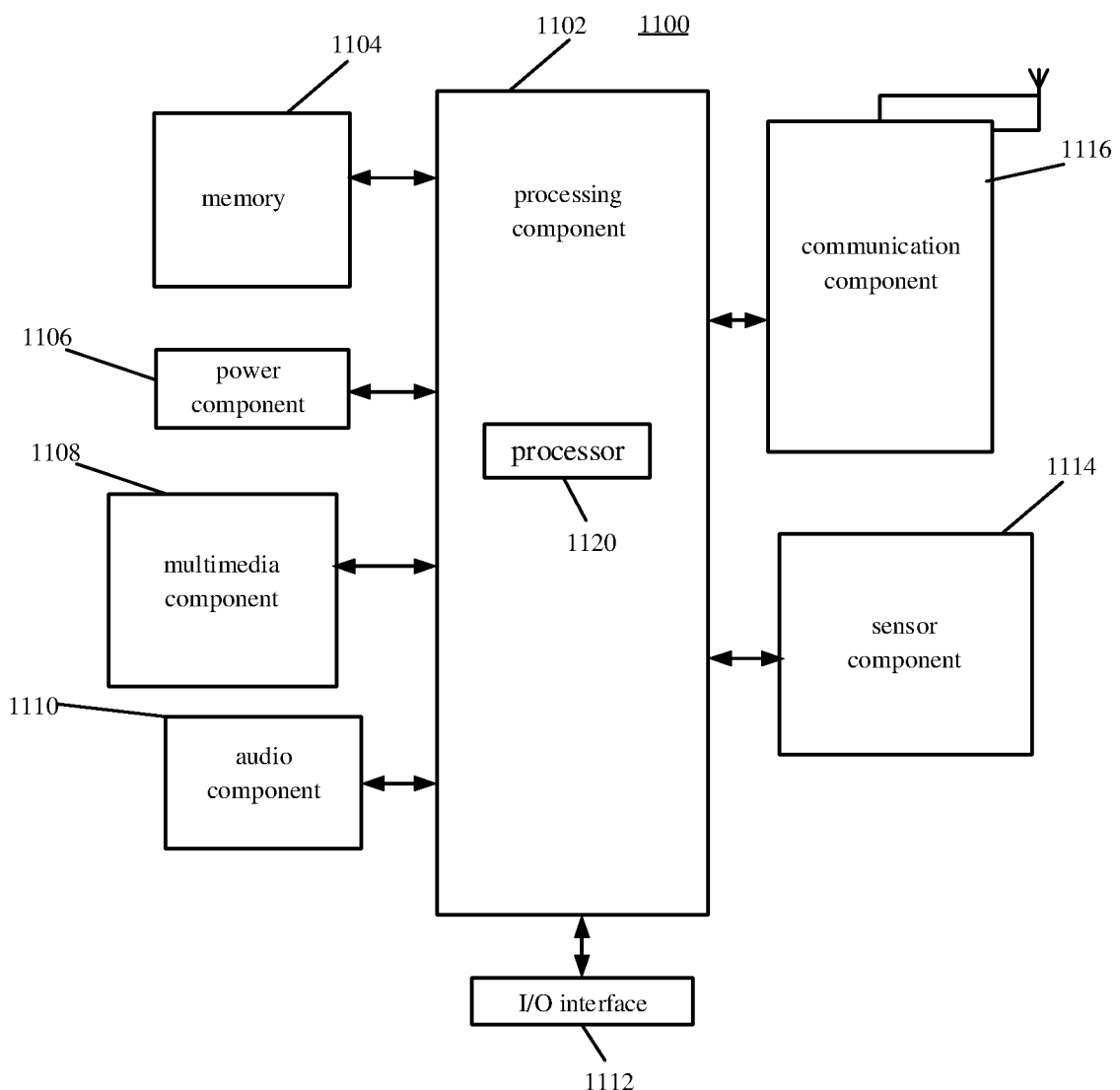
FIG. 11 is a block diagram of an electronic device for signal processing and color temperature detection according to an embodiment.

FIG. 11 is a block diagram of an electronic device 1100 for signal processing and color temperature detection according to an embodiment. For example, the device 1100 may be a mobile phone, a computer, a digital broadcasting terminal, a messaging device, a game console, a tablet device, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice identification mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 4G, or 5G, or a combination thereof. In one embodiment, the communication component 1116 receives a broadcast signal or broadcast associated information from an external broadcast management system via a broadcast channel In one embodiment, the communication component 1116 further includes a near field communication (NFC) module to facilitate short-range communications. In one embodiment, the communication component 1116 may be implemented based on a radio frequency identification (RFID) technology, an infrared data association (IrDA) technology, an ultra-wideband (UWB) technology, a Bluetooth (BT) technology, and other technologies.

The device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

With the technical solutions of the present disclosure, the optical fingerprint assembly integrated with the fingerprint sensor and the color temperature sensing unit is provided, which is applied to the electronic device. Since the optical fingerprint assembly may realize functions of color temperature detection and fingerprint identification, there is no need to separately arrange a color temperature sensor in the device, thus increasing the screen-to-body ratio and optimizing the display effect of the electronic device.

Furthermore, since there is no need to arrange the color temperature sensor separately, the layout space available for arranging other components in the electronic device is increased, making the layout of the optical fingerprint assembly more flexible, reducing the difficulty of the arrangement of components in the development process, and thus reducing the development cost.

Other embodiments of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are exemplary only, and the real scope and spirit of the present disclosure are indicated in the appended claims.

It should be understood that the present disclosure is not limited to the precise structures described above and illustrated in the drawings, and various modifications and changes may be made without departing from the scope thereof. The scope of the present disclosure is limited by the appended claims.

The above-described embodiments are only exemplary embodiments of the present disclosure and should not be constructed to limit the present disclosure. Any change, equivalent or modification made within the spirit and principle of the present disclosure shall be included in the scope of the present disclosure.

What is claimed is:

1. An optical fingerprint assembly, comprising:
   a fingerprint sensor configured to collect a light signal for fingerprint identification;
   a color temperature sensing unit configured to collect a light signal for color temperature detection;
   a fingerprint signal processing circuit connected to the fingerprint sensor and configured to process the light signal collected by the fingerprint sensor to generate a fingerprint signal;
   a color temperature signal processing unit connected to the color temperature sensing unit and configured to process the light signal collected by the color temperature sensing unit to generate a color temperature signal; and
   a control unit connected to the fingerprint signal processing circuit and the color temperature signal processing unit, the control unit being configured to generate fingerprint information for fingerprint identification according to the fingerprint signal output by the fingerprint signal processing circuit and to generate color temperature information of ambient light according to the color temperature signal output by the color temperature signal processing unit.

2. The optical fingerprint assembly according to claim 1, wherein the color temperature sensing unit comprises:
   a red light sensor configured to collect a red light signal for color temperature detection;
   a green light sensor configured to collect a green light signal for color temperature detection; and
   a blue light sensor configured to collect a blue light signal for color temperature detection; and
   wherein the color temperature signal processing unit comprises:
   a red light signal processing circuit, having a first end connected to the red light sensor and a second end connected to the control unit, and configured to process the red light signal collected by the red light sensor to obtain a red light color temperature signal;
   a green light signal processing circuit, having a first end connected to the green light sensor and a second end connected to the control unit, and configured to process the green light signal collected by the green light sensor to obtain a green light color temperature signal;
   a blue light signal processing circuit, having a first end connected to the blue light sensor and a second end connected to the control unit, and configured to process the blue light signal collected by the blue light sensor to obtain a blue light color temperature signal; and
   wherein the control unit is further configured to: generate the color temperature information of the ambient light according to the red light color temperature signal output by the red light signal processing circuit, the green light color temperature signal output by the green light signal processing circuit, and the blue color temperature signal output by the blue light signal processing circuit.

3. The optical fingerprint assembly according to claim 2, wherein the red light signal further contains first monochromatic light other than red light; the green light signal further contains second monochromatic light other than green light; and the blue light signal further contains third monochromatic light other than blue light; and
   the control unit is further configured to: remove a first color temperature signal, contained in the red light color temperature signal, that is processed from the first monochromatic light other than the red light; remove a second color temperature signal, contained in the green light color temperature signal, that is processed from the second monochromatic light other than the green light; and remove a third color temperature signal, contained in the blue light color temperature signal, that is processed from the third monochromatic light other than the blue light.

4. The optical fingerprint assembly according to claim 2, wherein the fingerprint signal processing circuit comprises: a first amplifying circuit, a first filtering circuit, and a first analog-to-digital conversion circuit sequentially connected in series;

the red light signal processing circuit comprises: a second amplifying circuit, a second filtering circuit, and a second analog-to-digital conversion circuit sequentially connected in series;

the green light signal processing circuit comprises: a third amplifying circuit, a third filtering circuit, and a third analog-to-digital conversion circuit sequentially connected in series; and the blue light signal processing circuit comprises: a fourth amplifying circuit, a fourth filtering circuit, and a fourth analog-to-digital conversion circuit sequentially connected in series.

5. The optical fingerprint assembly according to claim 1, further comprising: a plurality of color temperature sensing units arranged in different regions of the optical fingerprint assembly.

6. The optical fingerprint assembly according to claim 1, wherein the color temperature sensing unit is arranged within a predetermined distance from the fingerprint sensor.

7. An electronic device, comprising:

a touch display assembly; and an optical fingerprint assembly, wherein an assembly position of the optical fingerprint assembly corresponds to a fingerprint identification region formed at the touch display assembly, or the optical fingerprint assembly is disposed in a layer of color temperature detection and fingerprint identification of the touch display assembly, and wherein the optical fingerprint assembly comprises:

a fingerprint sensor configured to collect a light signal for fingerprint identification;

a color temperature sensing unit configured to collect a light signal for color temperature detection;

a fingerprint signal processing circuit connected to the fingerprint sensor and configured to process the light signal collected by the fingerprint sensor to generate a fingerprint signal;

a color temperature signal processing unit connected to the color temperature sensing unit and configured to process the light signal collected by the color temperature sensing unit to generate a color temperature signal; and a control unit connected to the fingerprint signal processing circuit and the color temperature signal processing unit, the control unit being configured to generate fingerprint information for fingerprint identification according to the fingerprint signal output by the fingerprint signal processing circuit and to generate color temperature information of ambient light according to the color temperature signal output by the color temperature signal processing unit.

8. The electronic device according to claim 7, wherein the color temperature sensing unit comprises:

a red light sensor configured to collect a red light signal for color temperature detection;

a green light sensor configured to collect a green light signal for color temperature detection; and a blue light sensor configured to collect a blue light signal for color temperature detection; and wherein the color temperature signal processing unit comprises:

a red light signal processing circuit, having a first end connected to the red light sensor and a second end connected to the control unit, and configured to process the red light signal collected by the red light sensor to obtain a red light color temperature signal;

a green light signal processing circuit, having a first end connected to the green light sensor and a second end connected to the control unit, and configured to process the green light signal collected by the green light sensor to obtain a green light color temperature signal; and a blue light signal processing circuit, having a first end connected to the blue light sensor and a second end connected to the control unit, and configured to process the blue light signal collected by the blue light sensor to obtain a blue light color temperature signal; and wherein the control unit is further configured to: generate the color temperature information of the ambient light according to the red light color temperature signal output by the red light signal processing circuit, the green light color temperature signal output by the green light signal processing circuit, and the blue color temperature signal output by the blue light signal processing circuit.

9. The electronic device according to claim 8, wherein the red light signal further contains first monochromatic light other than red light; the green light signal further contains second monochromatic light other than green light; the blue light signal further contains third monochromatic light other than blue light; and the control unit is further configured to: remove a first color temperature signal, contained in the red light color temperature signal, that is processed from the first monochromatic light other than the red light; remove a second color temperature signal, contained in the green light color temperature signal, that is processed from the second monochromatic light other than the green light; and remove a third color temperature signal, contained in the blue light color temperature signal, that is processed from the third monochromatic light other than the blue light.

10. The electronic device according to claim 8, wherein the fingerprint signal processing circuit comprises: a first amplifying circuit, a first filtering circuit, and a first analog-to-digital conversion circuit sequentially connected in series;

the red light signal processing circuit comprises: a second amplifying circuit, a second filtering circuit, and a second analog-to-digital conversion circuit sequentially connected in series;

the green light signal processing circuit comprises: a third amplifying circuit, a third filtering circuit, and a third analog-to-digital conversion circuit sequentially connected in series; and the blue light signal processing circuit comprises: a fourth amplifying circuit, a fourth filtering circuit, and a fourth analog-to-digital conversion circuit sequentially connected in series.

11. The electronic device according to claim 7, wherein the optical fingerprint assembly comprises a plurality of color temperature sensing units arranged in different regions of the optical fingerprint assembly.

12. The electronic device according to claim 7, wherein the color temperature sensing unit is arranged within a predetermined distance from the fingerprint sensor.

13. A signal processing method, comprising:
pre-determining a fingerprint identification condition and a color temperature detection condition;
when the fingerprint identification condition is met, collecting a light signal for fingerprint identification by a fingerprint sensor of an optical fingerprint assembly, and inputting the light signal collected by the fingerprint sensor into a fingerprint signal processing circuit of the optical fingerprint assembly to generate fingerprint information for fingerprint identification according to the fingerprint signal output by the fingerprint signal processing circuit; and
when the color temperature detection condition is met, collecting a light signal for color temperature detection by a color temperature sensing unit of the optical fingerprint assembly, and inputting the light signal collected by the color temperature sensing unit into a color temperature signal processing unit of the optical fingerprint assembly to generate color temperature information of ambient light according to the color temperature signal output by the color temperature signal processing unit.

14. The signal processing method according to claim 13, further comprising:
determining whether a touch action is detected in a fingerprint identification region formed at a touch display assembly of an electronic device;
wherein the fingerprint identification condition comprises detecting the touch action is at the fingerprint identification region; and
the color temperature detection condition comprises detecting no touch action at the fingerprint identification region.

15. The signal processing method according to claim 14, wherein
the fingerprint identification condition further comprises determining a pressing force corresponding to the touch action to be equal to or more than a preset pressure threshold when the touch action is detected at the fingerprint identification region; and
the color temperature detection condition further comprises detecting no touch action at the fingerprint identification region during a preset time period.

16. The signal processing method according to claim 14, wherein when either one of the color temperature detection condition and the fingerprint identification condition is not met, the other is determined to be met.

17. The signal processing method according to claim 14, wherein the color temperature detection condition and the fingerprint identification condition are independent of each other.

18. A color temperature detection method, applied to an electronic device comprising the optical fingerprint assembly according to claim 1, wherein the color temperature detection method comprises:
acquiring the color temperature signal generated by the color temperature signal processing unit of the optical fingerprint assembly through processing the light signal collected by the color temperature sensing unit of the optical fingerprint assembly;
acquiring a light interference region of the optical fingerprint assembly of the electronic device corresponding to a position of the color temperature sensing unit; and
correcting the color temperature signal on the basis of a screen light signal emitted from the light interference region, and generating the color temperature information of the ambient light according to the corrected color temperature signal.

19. The color temperature detection method according to claim 18, wherein acquiring the color temperature signal comprises:
acquiring a red light color temperature signal, a green light color temperature signal, and a blue light color temperature signal, wherein the red light color temperature signal is obtained by a red light signal processing circuit of the color temperature signal processing unit through processing a red light signal collected by a red light sensor of the color temperature sensing unit, the green light color temperature signal is obtained by a green light signal processing circuit of the color temperature signal processing unit through processing a green light signal collected by a green light sensor of the color temperature sensing unit, and the blue light color temperature signal is obtained by a blue light signal processing circuit of the color temperature signal processing unit through processing a blue light signal collected by a blue light sensor of the color temperature sensing unit;
acquiring the light interference region of the optical fingerprint assembly of the electronic device corresponding to the position of the color temperature sensing unit comprises:
acquiring a red light interference region of the optical fingerprint assembly corresponding to a position of the red light sensor of the color temperature sensing unit,
acquiring a green light interference region of the optical fingerprint assembly corresponding to a position of the green light sensor of the color temperature sensing unit, and
acquiring a blue light interference region of the optical fingerprint assembly corresponding to a position of the blue light sensor of the color temperature sensing unit;
correcting the color temperature signal on the basis of the screen light signal emitted from the light interference region comprises:
processing the red light color temperature signal on the basis of a screen light signal corresponding to the red light interference region to obtain a corrected red light color temperature signal,
processing the green light color temperature signal on the basis of a screen light signal corresponding to the green light interference region to obtain a corrected green light color temperature signal, and
processing the blue light color temperature signal on the basis of a screen light signal corresponding to the blue light interference region to obtain a corrected blue light color temperature signal; and
generating the color temperature information of the ambient light according to the corrected color temperature signal comprises: generating the color temperature information of the ambient light according to the corrected red light color temperature signal, the corrected green light color temperature signal, and the corrected blue light color temperature signal.

20. The color temperature detection method according to claim 19, wherein
processing the red light color temperature signal on the basis of the screen light signal corresponding to the red light interference region comprises:
determining a red light component, a green light component, and a blue light component contained in the screen light signal corresponding to the red light interference region,
acquiring a first interference coefficient of the red light component for the red light color temperature signal, a second interference coefficient of the green light component for the red light color temperature signal, and a third interference coefficient of the blue light component for the red light color temperature signal, and
correcting the red light color temperature signal on the basis of the red light component and the first interference coefficient, the green light component and the second interference coefficient, and the blue light component and the third interference coefficient;
processing the green light color temperature signal on the basis of the screen light signal corresponding to the green light interference region comprises:
determining a red light component, a green light component, and a blue light component contained in the screen light signal corresponding to the green light interference region,
acquiring a fourth interference coefficient of the red light component for the green light color temperature signal, a fifth interference coefficient of the green light component for the green light color temperature signal, and a sixth interference coefficient of the blue light component for the green light color temperature signal, and
correcting the green light color temperature signal on the basis of the red light component and the fourth interference coefficient, the green light component and the fifth interference coefficient, and the blue light component and the sixth interference coefficient; and
processing the blue light color temperature signal on the basis of the screen light signal corresponding to the blue light interference region comprises:
determining a red light component, a green light component, and a blue light component contained in the screen light signal corresponding to the blue light interference region,
acquiring a seventh interference coefficient of the red light component for the blue light color temperature signal, an eighth interference coefficient of the green light component for the blue light color temperature signal, and a ninth interference coefficient of the blue light component for the blue light color temperature signal, and
correcting the blue light color temperature signal on the basis of the red light component and the seventh interference coefficient, the green light component and the eighth interference coefficient, and the blue light component and the ninth interference coefficient.

* * * * *